US008665743B2

(12) United States Patent
Zhu et al.

(10) Patent No.: US 8,665,743 B2
(45) Date of Patent: Mar. 4, 2014

(54) USER BEHAVIOR MODEL AND STATISTICAL TRANSITION MAP TO ASSIST ADVANCED WLAN APPLICATIONS

(75) Inventors: Jiang Zhu, Sunnyvale, CA (US); Hui Liu, San Jose, CA (US); Flavio Bonomi, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 195 days.

(21) Appl. No.: 13/283,741

(22) Filed: Oct. 28, 2011

(65) Prior Publication Data

US 2013/0107728 A1    May 2, 2013

(51) Int. Cl.
*G01R 31/08* (2006.01)

(52) U.S. Cl.
USPC .......................................... 370/252; 370/338

(58) Field of Classification Search
None
See application file for complete search history.

(56) References Cited

U.S. PATENT DOCUMENTS

| | | | |
|---|---|---|---|
| 7,053,830 B2 * | 5/2006 | Krumm et al. ................ | 342/451 |
| 7,397,779 B2 | 7/2008 | Chandra et al. | |
| 2007/0149216 A1 * | 6/2007 | Misikangas ................ | 455/456.1 |
| 2008/0146230 A1 | 6/2008 | Pandian et al. | |
| 2008/0293405 A1 | 11/2008 | Meyer | |
| 2009/0067392 A1 * | 3/2009 | Hart et al. ..................... | 370/338 |
| 2009/0286534 A1 | 11/2009 | Garg et al. | |
| 2010/0118830 A1 | 5/2010 | Stephenson et al. | |
| 2011/0002295 A1 | 1/2011 | Ghosal et al. | |
| 2012/0050108 A1 * | 3/2012 | Whiting et al. ............... | 342/452 |
| 2012/0270573 A1 * | 10/2012 | Marti et al. ................... | 455/457 |
| 2013/0107728 A1 * | 5/2013 | Zhu et al. ...................... | 370/252 |
| 2013/0165144 A1 * | 6/2013 | Ziskind et al. ............. | 455/456.1 |

OTHER PUBLICATIONS

Allawi, et al., "Advanced Handoff Mechanism for Delay Sensitive Applications in IEEE 802.11 Wireless LAN," Feb. 17-20, 2008, pp. 1-4.
Bahl, et al., Microsoft Research, "RADAR: An In-Building RF-based User Location and Tracking System," IEEE INFOCOM 2000, pp. 775-784.
Brik, et al., "Eliminating handoff latencies in 802.11 WLANs using Multiple Radios: Applications, Experience, and Evaluation," ACM SIGCOMM IMC, Oct. 2005, pp. 1-6.
Caceres, et al., "Fast and Scalable Handoffs for Wireless Interworks," Proc. of ACM MobiCom '96, Nov. 1996, pp. 1-11.
Gonzalez, et al., "Understanding individual human mobility patterns," Nature, vol. 453, Jun. 5, 2008, pp. 779-782.

(Continued)

*Primary Examiner* — Robert Wilson
(74) *Attorney, Agent, or Firm* — Edell, Shapiro & Finnan, LLC (57) ABSTRACT

A statistical transition map is built based on mobile wireless device user mobility history data. This data is useful to assist various wireless local area network applications. Received signal strength and location trace information associated with movements of mobile wireless devices in a wireless network is collected. The received signal strength and location trace information is converted to a sequence of natural language pseudo-location word labels representing pseudo-locations of each mobile wireless device as each mobile wireless device moves about with respect to a plurality of wireless access point devices in the wireless network. A statistical transition map is generated for each mobile wireless device from the sequence of natural language pseudo-location word labels using a natural language model. A probability of a next pseudo-location for a particular mobile wireless device is computed based on its current location and its statistical transition map.

20 Claims, 10 Drawing Sheets

(56) References Cited

OTHER PUBLICATIONS

Ghosh, et al., "On Profiling Mobility and Predicting Locations of Campus-wide Wireless Network Users," UB-CSE Technical Report, May 2006, pp. 1-15.

Kim, et al., "Extracting a mobility model from real user traces," IEEE InfoCom, 2006, pp. 1-13.

Kim, et al., "Selective Channel Scanning for Fast Handoff in Wireless LAN using Neighbor Graph," The 2004 International Technical Conference on Circuits/Systems, Computers and Communications (ITC-CSCC2004), Hotel Taikanso, Sendai/Matsushima, Jul. 6-8, 2004, pp. 7F2P-29-1 to 7F2P-29-4.

Kleimola, et al., "Latency Issues in Distributed Musical Performance," Helsinki University of Technology, Telecommunications Software and Multimedia Laboratory, T-111.5080 Seminar on Content Creation, Fall 2006: Interactive Digital Theatre, Dec. 20, 2006, pp. 1-14.

Nicholson, et al., "BreadCrumbs: Forecasting Mobile Connectivity," Proceedings of the 14th ACM international Conference on Mobile Computing and Networking, Sep. 14-19, 2008, pp. 1-14.

Park, et al., "Effects of Network Characteristics on Human Performance in a Collaborative Virtual Environment," Proceedings of the IEEE Virtual Reality, Mar. 13-17, 1999, pp. 1-8.

Ramani, et al., "SyncScan: Practical Fast Handoff for 802.11 Infrastructure Networks," Proceedings of IEEE Infocom, 2005, pp. 1-10.

Shin, et al., "Improving the Latency of 802.11 Hand-offs using Neighbor Graphs," MobiSys'04, Jun. 6-9, 2004, pp. 1-14.

Song, et al., "Predictability of WLAN Mobility and its Effects on Bandwidth Provisioning," Proceedings of INFOCOM, Apr. 2006, pp. 1-13.

Song, et al., "Evaluating Location Predictors with Extensive Wi-Fi Mobility Data," IEEE INFOCOM, 2004, pp. 1-11.

Veriwave, "Large-scale Wireless Mobility Testing: Getting a handle on WLAN roaming issues," May 8, 2006, pp. 1-18.

IEEE, "IEEE Standard for Information technology, Telecommunications and information exchange between systems, Local and metropolitan area networks, Specific requirements, Part 11: Wireless LAN Medium Access Control (MAC) and Physical Layer (PHY) Specifications, Amendment 2: Fast Basic Service Set (BSS) Transition," IEEE Std 802.11r, 2008, pp. 1-126.

Michaelis, et al., "Comparison of User Mobility Pattern Prediction Algorithms to increase Handover Trigger Accuracy," IEEE Vehicular Technology Conference, May 2006, pp. 952-956.

Kwon, et al., "Handover prediction strategy for 3G-WLAN overlay networks," Network Operations and Management Symposium, 2008, NOMS 2008, pp. 1-4.

Pack, et al., "Fast Handoff Scheme based on Mobility Prediction in Public Wireless LAN Systems," IEEE Proceedings Communications, vol. 151, No. 05, pp. 489-495, Oct. 2004.

Issac, et al., "Wireless Mobility Management with Prediction, Delay Reduction and Resource Management in 802.11 Networks," IAENG International Journal of Computer Science, 35:3, Advanced online publication, Aug. 21, 2008, pp. 1-16.

\* cited by examiner

USER BEHAVIOR MODEL AND STATISTICAL TRANSITION MAP TO ASSIST ADVANCED WLAN APPLICATIONS

TECHNICAL FIELD

The present disclosure relates to wireless communication networks and systems.

BACKGROUND

Currently, wide deployment of enterprise wireless local area networks (WLANs) presents critical challenges to network design, deployment and management. Multimedia communications, such as Voice over WLAN (VoWLAN), become major applications in enterprise WLAN environment. Due to the delay-sensitive characteristics of these multimedia applications and the high mobility of user devices, how roaming is managed impacts overall WLAN performance and end-user experience.

DESCRIPTION OF EXAMPLE EMBODIMENTS

Overview

Techniques are provided to build a statistical transition map based on mobile wireless device user mobility history data and use this data to assist various WLAN applications. Received signal strength and location trace information associated with movements of mobile wireless devices in a wireless network is collected. The received signal strength and location trace information is converted to a sequence of natural language pseudo-location word labels representing pseudo-locations of each mobile wireless device as each mobile wireless device moves about with respect to a plurality of wireless access point devices in the wireless network. A statistical transition map is generated for each mobile wireless device from the sequence of natural language pseudo-location word labels using a natural language model. A probability of a next pseudo-location for a particular mobile wireless device is computed based on its current location and its statistical transition map.

Example Embodiments

Figure 1:
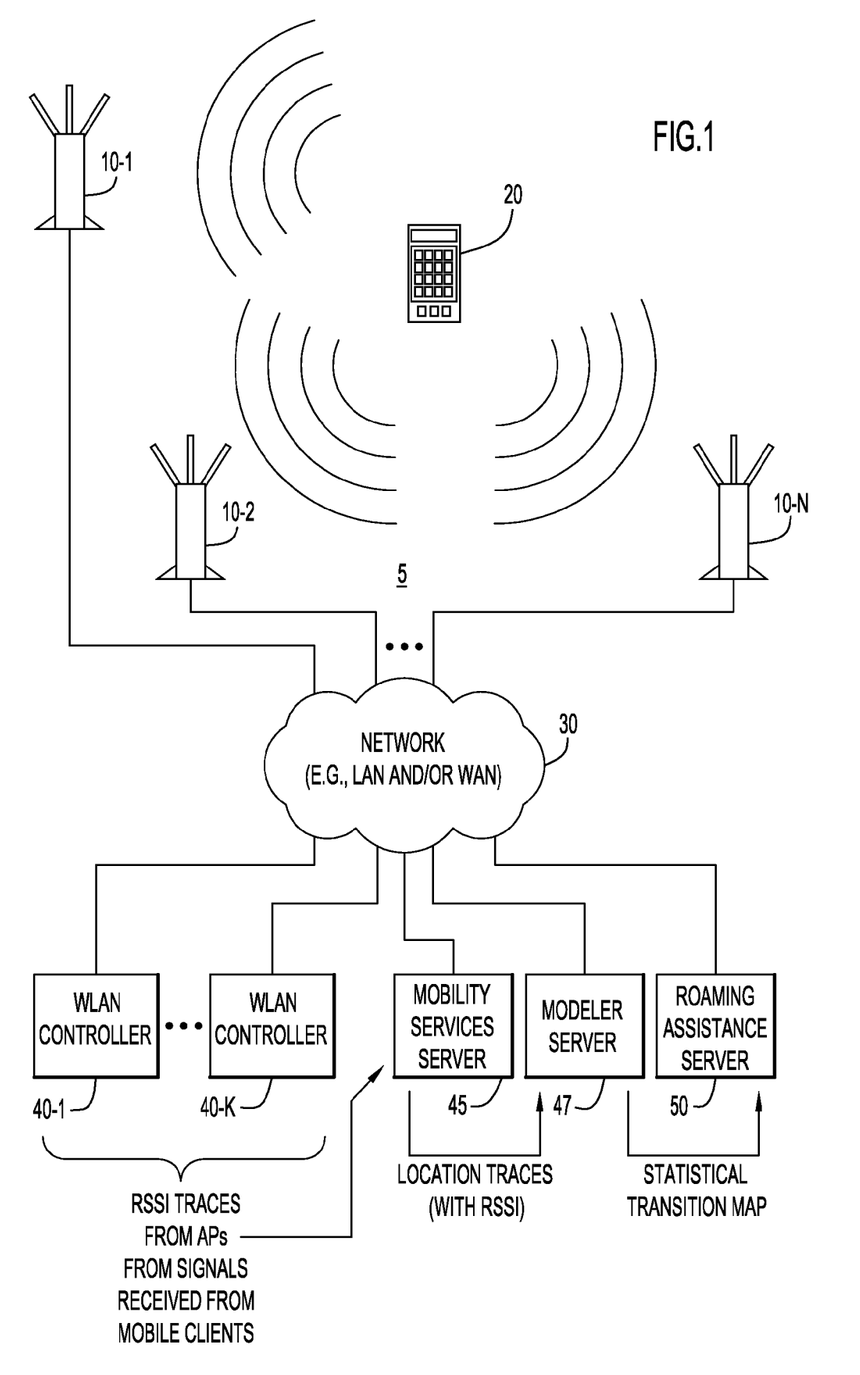
FIG. 1 is a system diagram showing wireless network infrastructure equipment configured to collect mobile devices mobility data from network traces, build a statistical transition map, and use the statistical transition map to assist advanced WLAN applications, such as seamless roaming and anomaly detection.

Referring first to FIG. 1, a wireless communication network is shown generally at reference numeral 5 comprising plurality of wireless access points (APs) 10-1, 10-2, . . . , 10-N, that are configured to wirelessly communicate with one or more client devices (also referred to herein as mobile wireless devices), one of which is shown at reference numeral 20. A single client device 20 is shown in FIG. 1 as an example and it is to be understood that the APs 10-1 through 10-N are capable of communicating with multiple wireless client devices. The client device 20 may be a laptop computer, tablet computer (e.g., iPAD™ device), or smart phone device with WLAN connectivity. In one example, the APs 10-1 through 10-N and the client device 20 operate in accordance with one of the IEEE 802.11 wireless local area network (WLAN) family of wireless communication protocols, known commercially as WiFi™. However, the techniques described herein are not limited to any particular wireless communication protocol and may be employed in WLANs as well as wireless wide area networks. In wireless wide area network terminology, the APs would be referred to as base stations.

It is common in certain WLAN deployments, for client devices to roam around a building or campus and in so doing need to associate to different APs in order to maintain connectivity to the WLAN. Determining which AP to hand-off a client device to is important in establishing a smooth transition as the client devices moves. The system and methods described herein provide for improved roaming support of mobile wireless devices based on historical patterns of individual mobile wireless devices.

Each of the APs 10-1 through 10-N are connected to a network (wired or wireless) 30, which typically includes local area network and wide area network connectivity. A plurality of WLAN controllers 40-1 to 40-K are also connected to the network 30. The WLAN controllers 40-1 to 40-K are used to control the various operating parameters of the APs (such as channel assignment, load, etc.). A group of APs may be assigned to a particular one of the WLAN controllers 40-1 to 40-K. The APs 10-1 to 10-N send received signal strength information (RSSI) obtained from measurements taken from signals received from mobile wireless devices as the mobile wireless devices move about a WLAN deployment.

A mobile services server 45 is provided to collect RSSI data (from the WLAN controllers 40-1 to 40-K) that are obtained by the APs 10-1 to 10-N for individual mobile wireless devices. As explained further hereinafter, the mobility services server 45 aggregates the RSSI data from multiple APs and calculates the physical location of user devices in the network, thereby building a location trace. Then the mobility services server 45 forwards this location trace (with timestamp information and RSSI data) to the modeler server 47 to apply n-gram language algorithm to build a statistical transition map. The modeler server 47 sends information representing the statistical transition map to an application server, such as a roaming assistance server 50 via network 30. The roaming assistance server 50 uses the statistical transition map data provided by the modeler server 47 to expedite selection for mobile wireless device scanning and AP selection by refining an AP neighbor list for a roaming event. In general, the roaming assistance server 50 can be any advanced WLAN application server, for example, dedicated to perform mobility-behavior based anomaly detection and other security application functions. Roaming assistance is only one example WLAN application.

While FIG. 1 shows that the mobility services server 45, modeler server 47 and roaming assistance server 50 are separate stand-alone servers, this is not meant to be limiting. For example, the functions of the modeler server 47 may be implemented as an application/process running on the mobility services server 45, or as an application on any application server such as the roaming assistance server 50. Thus, the functions of two or more of the mobility services server 45, modeler server 47 and roaming assistance server 50 may be integrated on the same server or collection of servers.

Figure 2:
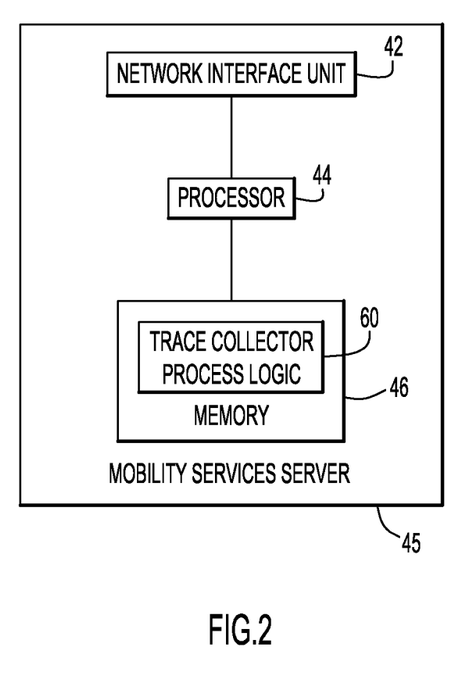
FIG. 2 is an example block diagram of a server computer configured to collect location information of mobile wireless devices obtained by wireless access points to provide input to the generation of the statistical transition map.

Turning now to FIG. 2, a block diagram showing an example of the components of the mobility services server 45 is now described. The mobility services server 45 includes a network interface unit 42, a processor 44 and a memory 46. The network interface unit 42 is, for example, an Ethernet card, and enables network connectivity to communicate over network 30 with the APs 10-1 to 10-N and with the roaming assistance server 50. The processor 44 is one or more microprocessors or microcontrollers. The memory 46 may be in the form of read only memory (ROM), random access memory (RAM), magnetic disk storage media devices, optical storage media devices, flash memory devices, electrical, optical, or other physical/tangible memory storage devices. The memory 46 stores instructions for trace collector process logic 60, whose operations are described further hereinafter. Thus, in general, the memory 46 may comprise one or more tangible computer readable storage media (e.g., a memory device) encoded with software comprising computer executable instructions and when the software is executed (by the processor 44) it is operable to perform the operations described herein in connection with trace collector process logic 60.

Figure 3:
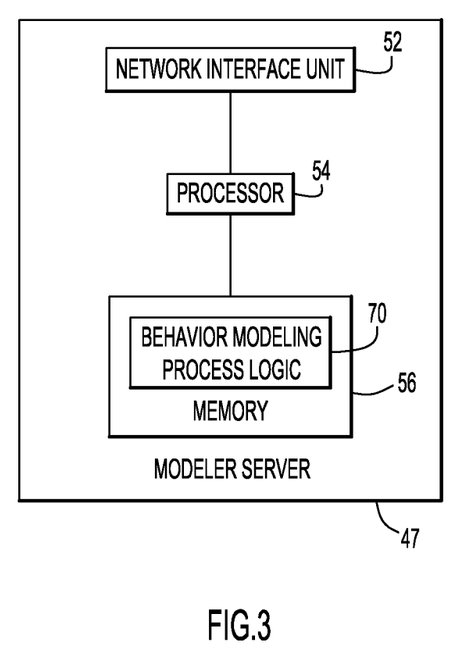
FIG. 3 is an example block diagram of a server computer configured to perform user behavior modeling to generate the statistical map for each mobile wireless device for advanced WLAN applications.

A block diagram showing an example of the components of the modeler server 47 is now described with reference to FIG. 3. The modeler server 47 includes a network interface unit 52, a processor 54 and a memory 56. The network interface unit 52 is, for example, an Ethernet card, and enables network connectivity over network 30 to communicate with the WLAN controllers 40-1 to 40-K and the mobility services server 45. The processor 54 is one or more microprocessors or microcontrollers. The memory 56 may be in the form of ROM, RAM, magnetic disk storage media devices, optical storage media devices, flash memory devices, electrical, optical, or other physical/tangible memory storage devices. The memory 56 stores instructions for behavior modeling process logic 70, whose operations are described further hereinafter. Thus, in general, the memory 56 may comprise one or more tangible computer readable storage media (e.g., a memory device) encoded with software comprising computer executable instructions and when the software is executed (by the processor 54) it is operable to perform the operations described herein in connection with behavior modeling process logic 70.

Generally, the techniques described herein involve constructing a statistical transition map based on network users' historical mobility location data. The map contains information representing the probability of mobile wireless devices movements from one network location to another, based on the mobile wireless device's past location patterns in the network. For predictive roaming application, this transition map can be specifically used to assist:

(1) Predict when the mobile wireless device will roam;

(2) Predict the most probable target AP to which the mobile wireless device will roam; and (3) Set up application contexts within frequent roaming AP groups.

The statistical transition map is also useful to detect anomalies in client device mobility patterns for security and other context-aware applications.

For simplicity, the following terms are defined:

Location Transition Map: a bi-directional graph, with each link (one location to another) storing the probability of user moves between the two locations, based on past history data for a particular client device (indexed by the media access control (MAC)) address or other unique client device identifier, or a group of devices that share similar characteristics or mobility behaviors.

The following terms are specific to a seamless roaming application.

Frequent Roaming Group: The scope of a group of APs for which the roaming probability between each other is above a preset threshold. The definition of this group helps the APs in the Frequent Roaming Group to synchronize mobile wireless device information to reduce the delay to resume an application when the mobile wireless device roams.

Neighbor List: this is a list of APs sent to the mobile wireless device using a proprietary frame or standard compliant frame, e.g., such as according to IEEE 802.11k. The generation of a neighbor list and the usage of it at a mobile wireless device is vendor specific. A neighbor list may be used to rank the APs using a weight calculation based on one or more of roaming probability, load balancing criteria, etc.

Figure 4:
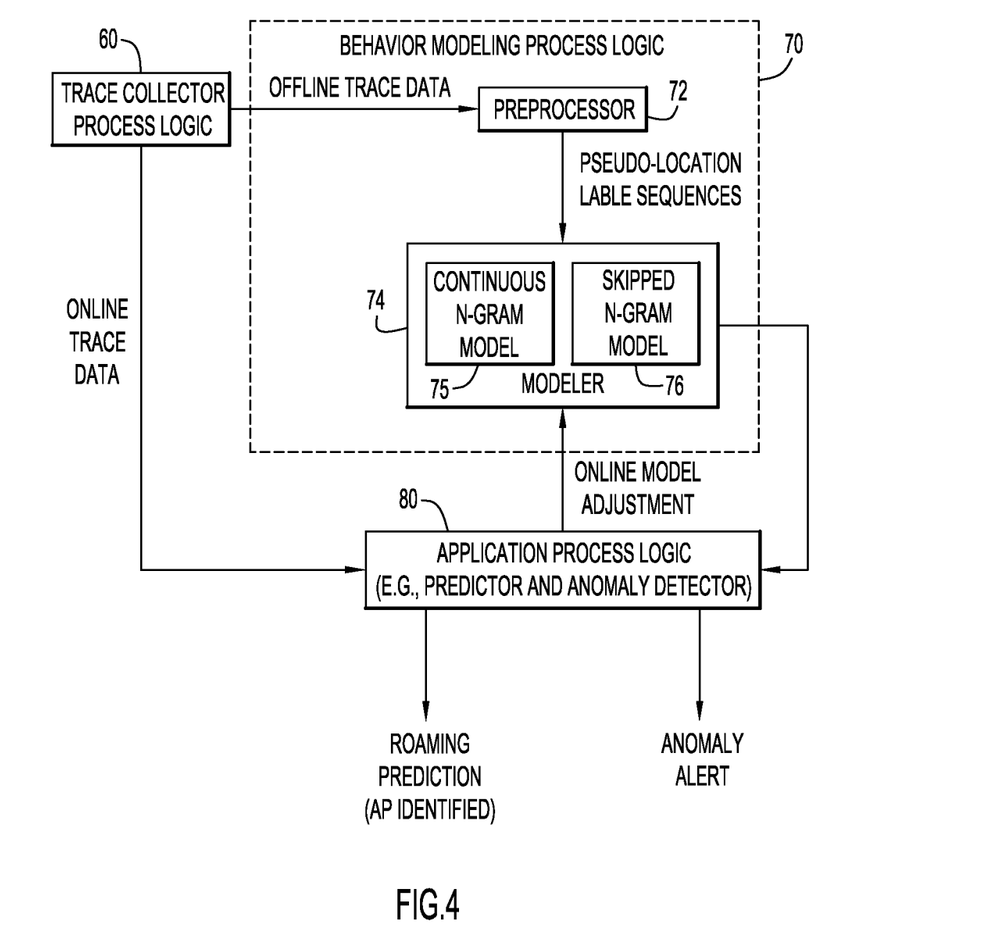
FIG. 4 is a diagram depicting the functional relationships of the operations of the user location trace collection and user behavior modeling to generate the statistical transition map for each mobile wireless device.

Reference is now made to FIG. 4 together with FIGS. 5-9. FIG. 4 illustrates a software functional diagram of the operations of the trace collector process logic 60, the behavior modeling process logic 70, and roaming assistance process logic 80 that is executed on the roaming assistance server 50. Generally, the operations of the trace collector process logic 60 and the behavior modeling logic 70 are to track movement patterns of wireless client devices as users move about and roams between locations. Based on the RSSI information, a statistical transition map representing statistical user mobility behavior in the wireless network is generated for each mobile wireless device.

Figure 5:
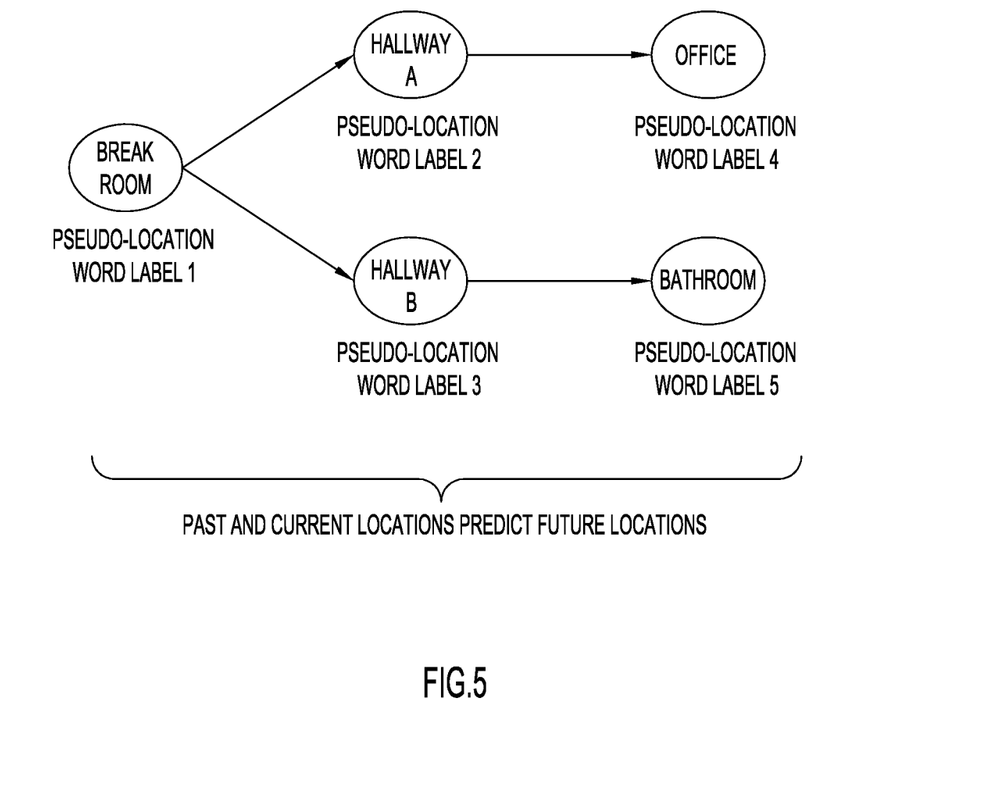
FIG. 5 is an example of the mobility behavior of a mobile wireless device and showing how pseudo-location word labels are assigned to each pseudo-location of a mobile wireless device according to the techniques described herein.

FIG. 5 generally pictorially depicts the operations of the methods describe herein where the past and current locations of a client devices are used to predict the future locations (and thus to which AP the client device will mostly likely roam). More specifically, as will become more apparent hereinafter, user mobility is represented as a short sequence of locations. APs are positioned to cover different areas, such as a Break Room, Hallway A, Hallway B, Office and Bathroom. These are examples of locations that are tracked for a client device over time in order to develop a statistical model that is used to predict, in real-time, where the client device will likely move. As further explained hereinafter, each network location is assigned a pseudo-location word label. For example, the Break Room is assigned pseudo-location word label 1, Hallway A is assigned pseudo-location word label 2, Hallway B is assigned pseudo-location word label 3, Office is assigned pseudo-location word label 4 and Bathroom is assigned pseudo-location word label 5. A different textual (word) symbol is assigned to each pseudo location.

Figure 6:
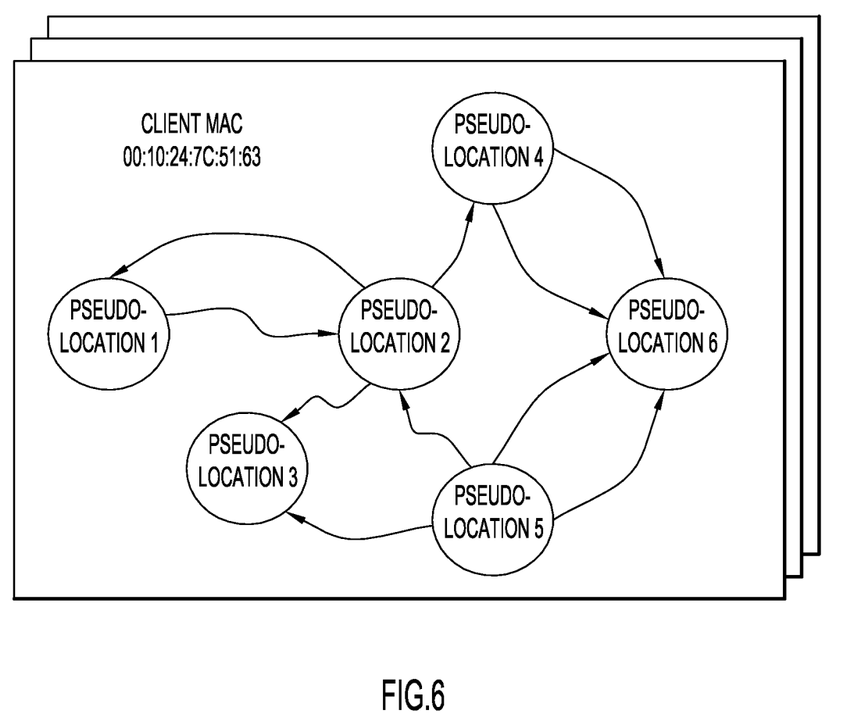
FIG. 6 is a graphical diagram illustrating an example of a statistical transition map.

The trace collector process logic 60 obtains RSSI trace data that comprises RSSI readings made by APs for each client device. More specifically, the trace collector 60 aggregates the traces for a particular user from a collection of APs and calculates the network location for each wireless device movement. The behavior modeling process logic 70 then uses the location data and timestamps from the trace collector process logic 60 to build the location transition map as depicted by FIG. 6. FIG. 6 shows the various pseudo-locations (labeled 1-6) of a mobile wireless device. Thus, the statistical transition map is a collection of pseudo-location labels and a link between the locations represents the probability of a mobile device moving from one location to another based on historical mobility events. A pseudo-location is a mapping of a physical location into an abstracted label to represent location information without exposing the absolute physical location parameters of a physical location. For example, for a certain (xmin, xmax) and (ymin, ymax) range in the (x,y) axis, a pseudo-location is given a label AA that represents all physical locations in the defined range.

Referring back to FIG. 4, the preprocessor function 72 of the behavior modeling process logic 70 is now described. The preprocessor function 72 may be embodied as a software module that resides on a standalone server, e.g., mobility services server, and runs as a service. The preprocessor function 72 takes the RSSI traces from the trace collector process logic 60 (used for determining the location of a wireless device) and performs the following preprocessing tasks. First, it quantizes and serializes the RSSI readings to convert them into RSS vector series $$\vec{s_i} = (s_{1,i}, s_{2,i}, \ldots, s_{N,i}),$$

where i is a client device index or identifier and $s_1$, $s_2$, $s_N$ are time-stamped RSSI readings at different APs. The trace collector 60 will output RSSI trace and location data that is used to build up a statistical transition map (specific to each mobile wireless device) for respective client devices during an "offline phase" and also to supply RSSI trace and location data used in real-time during an "online phase" to predict roaming of client devices based on the statistical transition map.

Next, the preprocessor 72 performs a clustering procedure. Due to the large dimension of the RSS vector space, the clustering procedure is used to reduce the vector dimension. i.e., similar vectors are group together to form a cluster. All the vectors within the same cluster are assigned one pseudo-location word label.

Figure 7:
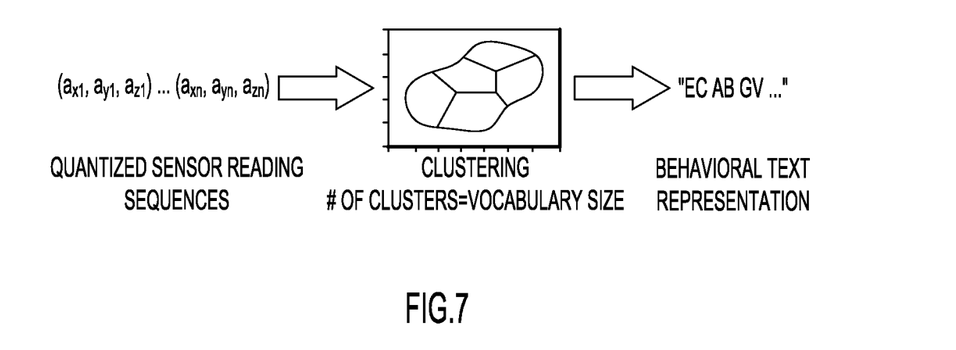
FIG. 7 is a diagram illustrating the operations of the conversion of mobile device locations to a clustered representation and then to pseudo-location word labels.

The quantizing and clustering operations of the preprocessor 72 are depicted in FIG. 7. Quantized sensor readings ($a_{x1}$, $a_{y1}$, $a_{z1}$) ... ($a_{xn}$, $a_{yn}$, $a_{zn}$), that is measurements made by APs, are clustered and clusters of like/similar vectors are assigned a common pseudo-location label. Examples of pseudo-location labels in FIG. 7 are "EC", "AB", and "GV". When there are repeating labels in a sequence, this indicates that a client device is staying at a particular location for a period of time (e.g., "EC"-"EC"-"EC"). Repeating labels can be collapsed or combined into a single "jumbo" label that records/stores the length of the time that the client device is at the particular location (a so-called "stay-duration"). The series of labels is "smoothed" out to remove any variations caused by RSS noise or small movements. Finally, the preprocessor 72 tags each pseudo-location word label with the time-of-day information and stay-duration information. Thus, the output of the preprocessor 72 are pseudo-location word label sequences for each mobile wireless device, where each entry in the sequence is a natural language pseudo-location word label such that all vectors within the same cluster are assigned the same pseudo-location word label and repeating labels are combined into a single pseudo-location word label.

Referring back to FIG. 4, the modeler function 74 is now described. The modeler function 74 also may run as a service on a standalone server, e.g., the mobility services server 50. The modeler function 74 takes the pseudo-location word label sequences generated by preprocessor 72 and builds the statistical transition map for each user (mobile wireless device).

Based on the principle of "language as action", natural language and human behavior share common characteristics. They are both tools by which humans achieve their ends, the meanings of which depend on the structure of the observed sequence of the composing elements, and they both have grammars that help to explain the underlying "syntactic structure" of an observed sequence. By representing the RSSI readings as symbols through quantization or clustering and applying statistical natural language processing algorithms on these symbols sequences, the RSSI readings made by APs can be pictured as sensors constantly "writing" a lifelogger in text about the life of a client device user. Applying statistical natural language processing algorithms on this {\em lifelog} allow for building a behavior model for each client device user.

In the WiFi roaming context, the RSS traces can also be converted to textual representations and neuro-linguistic programming (NLP) methods and tools used to make the modeling more efficient. Two methodologies may be employed for low overhead, high performance mobility behavior modeling.

The first is a continuous n-gram model function shown at reference numeral 75 in FIG. 4. n-gram models have proven to be very robust in modeling sequences of data. Using an n-gram model trained on English text, it can be estimated whether 'United' or 'house' is more likely to follow the phrase 'the president of the' by comparing the probability P('United'|'the president of the') and P('house'|'the president of the').

In the context of the mobile wireless device mobility behavior, the RSS traces are modeled using the n-gram model. Similar to natural language, it assumed that the sequence of the mobile wireless device's pseudo-locations can also be predicted by n consecutive locations in the past. A pseudo-location label is a 'word' in a language (e.g., English language) and an n-gram language model is trained on the RSS trace data as text by converting each RSS vector into a symbolic textual/word label.

The n-gram model function 74 estimates the next pseudo-location label l_i given the previous n−1 pseudo locations from the RSS trace as $$P(l_i|l_{i-n+1}, l_{i-n+2}, \ldots, l_{i-1}) \text{ or } P(l_i|l_{i-n+1}^{i-1}) \text{ in short.}$$

A maximum likelihood estimate (MLE) of the probability of a sequence of pseudo-location labels L={$l_1, l_2, \ldots, l_N$} can be written as:

$$P_{MLE}(l_i \mid l_{i-n+1}^{i-1}) = \frac{C(l_{i-n+1}, \ldots, l_{i-1}, l_i)}{C(l_{i-n+1}, \ldots, l_{i-1})},$$

or average log probability as:

$$\frac{1}{N}\sum_{i=1}^{N}\log P(l_i \mid l_{i-n+1}^{i-1}).$$

The model probabilities can be estimated through the MLE from training data by counting the occurrences of pseudo-location labels. The MLE assigns probability zero to any unseen n-grams if a data set contains n-grams that have never occurred in the training data. To address this issue, Good-Turing discounting and Katz backoff smoothing may be applied to discount the MLE probability for each observed n-grams in the training data and reserve some probability mass for unseen events.

The skipped n-gram model function 76 is now described. In natural language, words in a sentence may have "long-distance dependencies." For example, the sentence "I hit the tennis ball" has three-word level tri-grams: "I hit the", "hit the tennis" and "the tennis ball." However, it is clear that an equally important tri-gram implied by this sentence, "hit the ball", is not normally captured because of the separator "tennis." If the word "tennis" is skipped, this important tri-gram can be formed.

Figure 8:
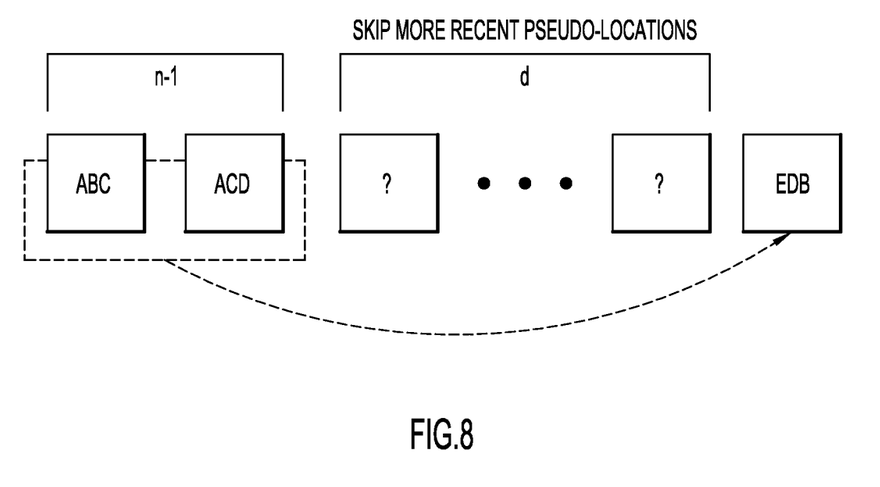
FIG. 8 is a diagram illustrating the operations of a skipping n-gram model to filter out detracting pseudo-locations from the statistical transition map of a mobile wireless device.

Similarly, the continuous n-gram model function 75 assumes that a mobile wireless device user's next action is dependent solely on his/her previous n−1 actions. However, in many cases one's future mobility behavior depends on behaviors that happened a while ago, while the intermediate (more recent) behaviors have little relevance or influence on the present and future behaviors. For example, knowing that a user is leaving the break room and entering the hallway which leads to his office, it can be predicted that he will be in his office soon. In other words, his intermediate actions along the hallway and his actions right before entering the office are not that important once we know that he is leaving the break room. This is shown in FIG. 8, where the pseudo-location labels "ABC" and "ACD" are more predictive of the client device user's next location, "EDB."

To model such long-distance dependencies, the skipped n-gram model function 76 is employed to filter out irrelevant intermediate pseudo-locations of a mobile wireless device. A skipped n-gram is a pair (L, l) extracted from the behavior text, where L is a label sequence of n−1 labels and l is the label that is assigned after skipping d labels from L. Usually L and l have strong correlations. In other words, the occurrence of L triggers the occurrence of l in the future.

By skipping pseudo-location entries that are detractors or non-contributors, the skipped n-gram model becomes more robust to noise in data which is caused by either interference or a "ping-pong" phenomenon. Furthermore, skipping detracting n-grams reduces the size of the model in terms of computational time and storage size (as the model has comparable performance for a lower value of n than when the model takes detracting grams into account).

Referring back to FIG. 4, application process logic 80 is now described. Application process logic 80 runs on an application server, e.g., roaming assistance server 50 shown in FIG. 1. The application process logic 80 takes a small sequence of RSS trace and location data (from the trace collector process logic 60) of a particular mobile wireless device and converts it to a label sequence using a process similar to that described above for the preprocessor function 72. The roaming assistance process logic 80 then looks up the wireless device's statistical transition map generated by the modeler function 74 and computes the probability of the next pseudo-location label. For roaming assistance, the application process logic 80 has a predictor function that assigns a probability of the pseudo-location label to the corresponding AP in the AP neighbor list for a wireless device and outputs the sorted neighbor list based on the probability for use by the wireless device.

Figure 9:
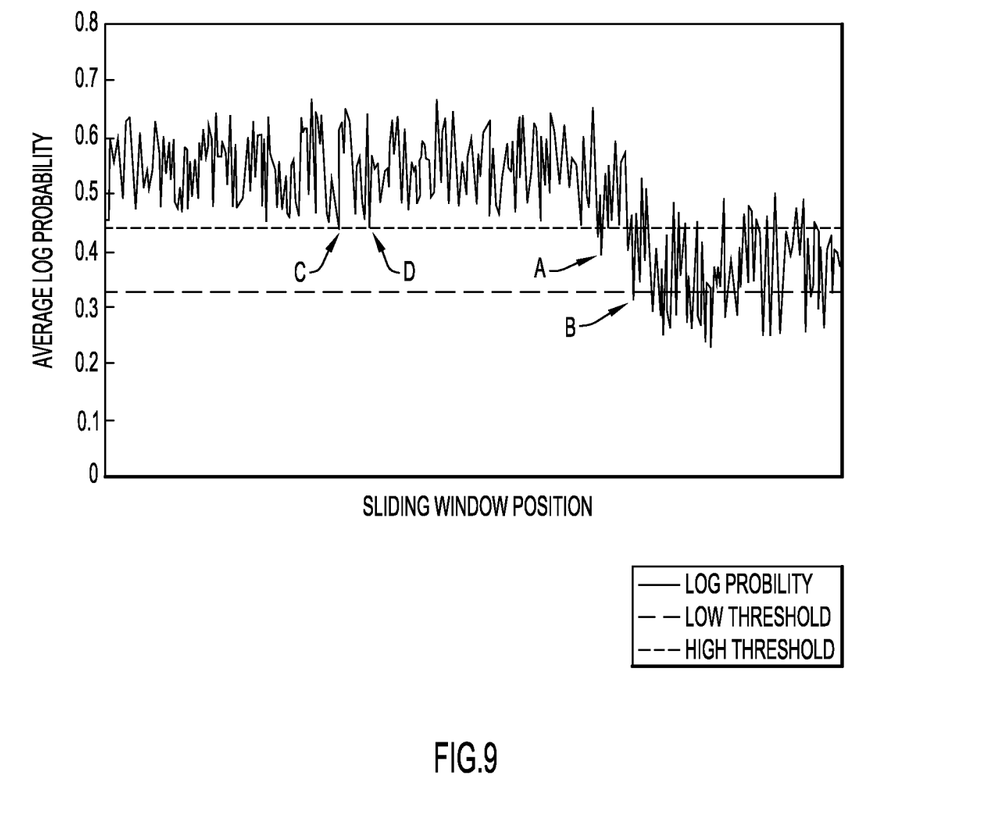
FIG. 9 is a diagram illustrating operations associated with anomaly detection from probability analysis of the statistical transition map.

For anomaly detection, the roaming assistance process logic 80 analyzes the current online RSS trace and location data received from the trace collector process logic 60 against the model generated by the modeler function 74 to determine whether a location/mobility anomaly has occurred. Reference is now made to FIG. 9. For example, a sequence of past pseudo-locations are fed into a sliding window of size N for n-gram model testing. For a testing sequence of pseudo-locations $L=l_1, l_2, \ldots, l_N$, the estimated average log probability of this sequence is generated from the n-gram or skipped n-gram model as:

$$\frac{1}{N}\sum_{i=1}^{N}\log P(l_i \mid l_{i-n+1}^{i-1}).$$

If this likelihood computed drops below a threshold, an anomaly alert is generated. There may be "high" thresholds and "low" thresholds. Points C and D are above the "high" threshold and do not generate an alert whereas point A may generate an alert because it dropped below the high threshold. Point B may generate an alert due to dropping below the low threshold.

Figure 10:
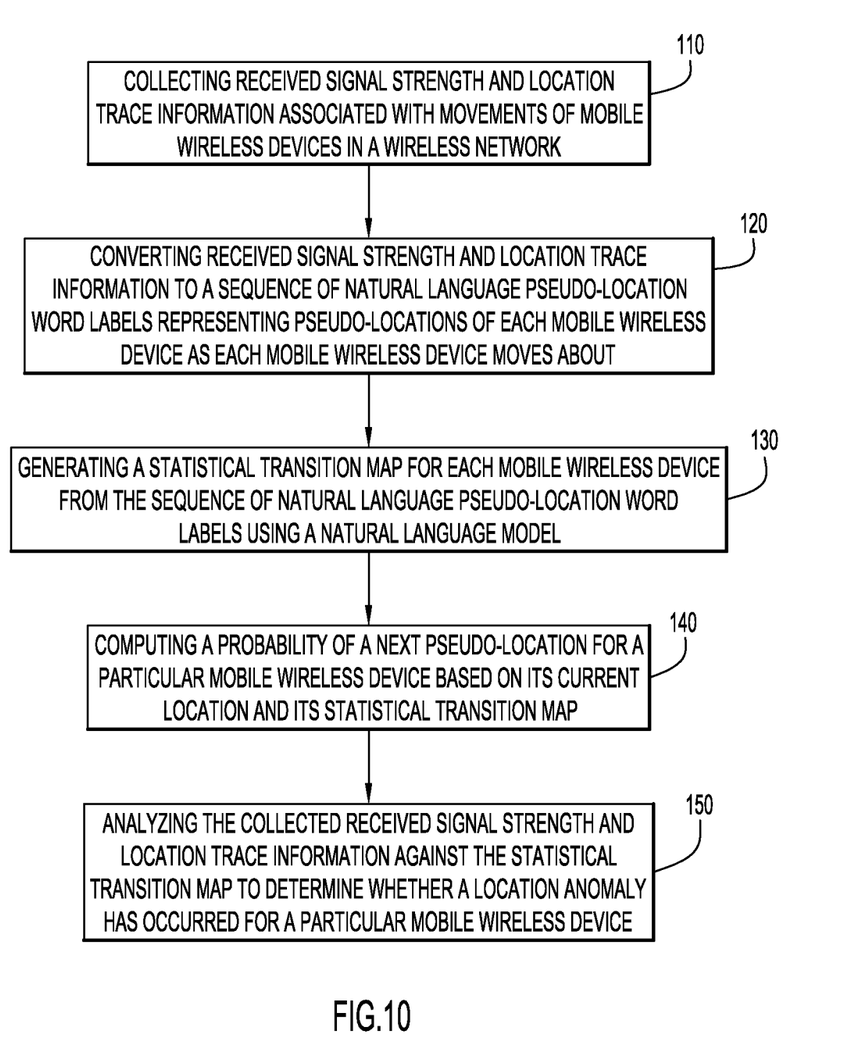
FIG. 10 is a flow chart generally depicting the operations of the user behavior modeling techniques described herein.

Reference is now made to FIG. 10 that illustrates a flow chart depicting the overall functional flow of the techniques described herein. At 110, received signal strength and location trace information associated with movements of mobile wireless devices in the wireless network is collected/aggregated. As explained above, this collection and location trace building operation may be performed by the trace collector process logic 60 that is executed on a mobile services server. At 120, the RSSI and location trace information for each mobile wireless device is converted to a series (sequence) of natural language pseudo-location word labels representing pseudo-locations of each mobile wireless device as each mobile wireless device moves about with respect to a plurality of wireless access points in the wireless network. As explained above, prior to converting the received signal strength and location trace information to a series of natural language pseudo-location word labels, the received signal strength and location trace information may be aggregated for each mobile wireless device, and a time series of received signal strength vectors is generated for each mobile wireless device. In addition, similar vectors may be grouped together to form a cluster so that the same natural language pseudo-location word label is assigned to all vectors within the same cluster. Further still, when repeating pseudo-location labels occur (consecutively), they may be combined into a single pseudo-location word label and data is stored for a time duration of a repeating label, the data representing a stay-duration at a particular pseudo-location and including time-of-day information for the single label.

At 130, a statistical mobility model (statistical transition map) is generated for each mobile wireless device from the sequence of natural language pseudo-location word labels using a natural language model. The statistical transition map may be generated by applying an n-gram model to sequences of pseudo-location word labels for corresponding mobile wireless devices to assign a probability to a particular mobile wireless device's future location based on prior pseudo-locations of the particular mobile wireless device. Moreover, the statistical transition map data for each mobile wireless device may be further reduced in size by applying a skipped n-gram model to filter out unlikely pseudo-locations.

At 140, a probability of a next pseudo-location for a particular mobile wireless device is computed based on its current location and its statistical transition map. Ultimately, this probability computed at 140 is used to update a neighbor list for a particular mobile wireless device in the wireless network as the particular mobile wireless device moves. The neighbor list may be sent to the particular mobile wireless device via messages generated and sent from the mobility services server 45 (via an appropriate one of the WLAN controllers 40-1 to 40-K) shown in FIG. 1. In addition, at 150, the collected received signal strength and location trace information is analyzed against the statistical transition map to determine whether a mobility anomaly has occurred for a particular mobile wireless device. This mobility anomaly analysis may involve, as described above, for a "testing" sequence of pseudo-locations, computing an estimated average log probability, and generating an indication of a location anomaly when the estimated average log probability is less than a threshold.

In summary, the advanced WLAN application (e.g., seamless roaming and anomaly detection) assistance techniques described herein involve generating a statistical transition map using a natural language representation for locations in a wireless device's mobility trace. This has several advantages. First, it is not necessary to store RSS mobility traces of the users. Instead, sufficient statistics (n-gram models) are constructed of user mobility behaviors. The behavioral textual representation in the statistical transition map, which is generated from the RSS mobility traces, contains sufficient information to model a user's mobility behavior. Second, given a behavioral text string in the statistical transition map, it is not possible to reconstruct this user's mobility trace. Consequently, the user's mobility behavior patterns are kept private. The use of an n-gram model to capture the statistical transition of the mobility patterns achieves substantial accuracy improvement. A skipped n-gram model is also useful to filter out the transit locations as well as noise in the trace due to interference and small scale movement substantially improves performance.

Again, the techniques described herein use an n-gram model to build a mobility statistical transition map based on real human mobility patterns. A high probability neighbor list is built using the statistical transition map. The high probability neighbor list that is built based on the statistical model is not directly based on geographical information and can be dynamic and adaptive due to building floor plan reconfigurations or functional changes of the users in the building. In past deployments, a system administrator sometimes found that the physical proximity of the APs did not relate to the high probability of roaming because the cubicle/office configuration and hallways divide the open space into small sections and the users can not physically roam between certain sections. This limit forced the system administrators to manually or semi-manually adjust the neighbor list. The techniques described herein are based on real user roaming traces and can be adaptive to changing environment characteristics dynamically.

The techniques described herein may be used in conjunction with other mobility solutions (neighbor lists) to improve the prediction accuracy per user, per user group or per network segment, in order to overall improve the roaming performance.

The system and methods described herein improve the "hit" rate of a recommended neighbor list in roaming scenarios by employing a statistical roaming map built upon the analysis of user mobility historical behavior. The model can also be adapted based on the real-time data collected passively from the network and as a result, the user mobility data so built evolves over time.

The above description is intended by way of example only.

What is claimed is:

1. A method comprising:
  collecting received signal strength and location trace information associated with movements of a plurality of mobile wireless devices in a wireless network;
  converting the received signal strength and the location trace information into a sequence of natural language pseudo-location word labels representing pseudo-locations of each mobile wireless device as each mobile wireless device moves about with respect to a plurality of wireless access point devices in the wireless network;
  generating a statistical transition map for each mobile wireless device from the sequence of natural language pseudo-location word labels using a natural language model; and
  computing a probability of a next pseudo-location for a particular mobile wireless device based on both current location and the statistical transition map of the particular mobile wireless device.

2. The method of claim 1, and further comprising aggregating the received signal strength and the location trace information for each mobile wireless device, and generating a time series of received signal strength vectors for each mobile wireless device.

3. The method of claim 2, and further comprising grouping similar received signal strength vectors together to form a cluster, and assigning the same natural language pseudo-location word label to all vectors within the same cluster.

4. The method of claim 3, and further comprising combining repeating natural language pseudo-location word labels into a single natural language pseudo-location word label, storing data that represents a stay-duration at a particular pseudo-location and includes time-of-day information for the single natural language pseudo-location word label.

5. The method of claim 4, wherein generating the statistical transition map further comprises applying an n-gram model to sequences of pseudo-location word labels for corresponding mobile wireless devices to assign a probability to a future location of the particular mobile wireless device based on prior pseudo-locations of the particular mobile wireless device.

6. The method of claim 5, wherein generating the statistical transition map further comprises applying a skipped n-gram model to filter out irrelevant intermediate pseudo-locations.

7. The method of claim 1, and further comprising updating a neighbor list for the particular mobile wireless device in the wireless network using the statistical transition map for the particular mobile wireless device as the particular mobile wireless device moves.

8. The method of claim 1, and further comprising analyzing the collected received signal strength and the location trace information against the statistical transition map to determine whether a mobility anomaly has occurred for the particular mobile wireless device.

9. The method of claim 8, wherein analyzing comprises, for a testing sequence of pseudo-locations, computing an estimated average log probability, and generating an indication of a mobility anomaly when the estimated average log probability is less than a threshold.

10. The method of claim 1, wherein collecting is performed by a first server computer that receives received signal strength and location trace information generated by the plurality of wireless access point devices, and converting, generating and computing are performed by a second server computer in communication with the first server computer.

11. An apparatus comprising:
a network interface unit configured to enable communication over a network in order to receive signal strength and location trace information associated with movements of a plurality of mobile wireless devices in a wireless network; and
a processor coupled to the network interface unit, wherein the processor is configured to:
convert both the received signal strength and the location trace information associated with the movements of each mobile wireless device in the wireless network into a sequence of natural language pseudo-location word labels representing pseudo-locations of each mobile wireless device as each mobile wireless device moves about with respect to a plurality of wireless access point devices in the wireless network;
generate a statistical transition map for each mobile wireless device from the sequence of natural language pseudo-location word labels using a natural language model; and
compute a probability of a next pseudo-location for a particular mobile wireless device based on both current location and the statistical transition map of the particular mobile wireless device.

12. The apparatus of claim 11, wherein the processor is further configured to aggregate the received signal strength and the location trace information for each mobile wireless device, generate a time series of received signal strength vectors for each mobile wireless device, group similar vectors together to form a cluster, and assign the same natural language pseudo-location word label to all vectors within the same cluster.

13. The apparatus of claim 12, wherein the processor is configured to generate the statistical transition map by applying an n-gram model to sequences of pseudo-location word labels for corresponding mobile wireless devices to assign a probability to a future location of the particular mobile wireless device based on prior pseudo-locations of the particular mobile wireless device.

14. The apparatus of claim 11, wherein the processor is configured to update a neighbor list for the particular mobile wireless device in the wireless network using the statistical transition map for the particular mobile wireless device as the particular mobile wireless device moves.

15. The apparatus of claim 11, wherein the processor is configured to analyze the collected received signal strength and the location trace information against the statistical transition map to determine whether a mobility anomaly has occurred for the particular mobile wireless device.

16. One or more non-transitory computer readable storage media storing software instructions and when the instructions are executed by a processor, cause the processor to:
convert received signal strength and location trace information associated with movements of a plurality of mobile wireless devices in a wireless network into a sequence of natural language pseudo-location word labels representing pseudo-locations of each mobile wireless device as each mobile wireless device moves about with respect to a plurality of wireless access point devices in the wireless network;
generate a statistical transition map for each mobile wireless device from the sequence of natural language pseudo-location word labels using a natural language model; and
compute a probability of a next pseudo-location for a particular mobile wireless device based on both current location and the statistical transition map of the particular mobile wireless device.

17. The non-transitory computer readable storage media of claim 16, and further comprising instructions that cause the processor to aggregate the received signal strength and the location trace information for each mobile wireless device, generate a time series of received signal strength vectors for each mobile wireless device, group similar vectors together to form a cluster, and assign the same natural language pseudo-location word label to all vectors within the same cluster.

18. The non-transitory computer readable storage media of claim 17, wherein the instructions that cause the processor to generate the statistical transition map comprise instructions that cause the processor to apply an n-gram model to sequences of pseudo-location word labels for corresponding mobile wireless devices to assign a probability to a future location of the particular mobile wireless device based on prior pseudo-locations of the particular mobile wireless device.

19. The non-transitory computer readable storage media of claim 16, and further comprising instructions that cause the processor to update a neighbor list for the particular mobile wireless device in the wireless network using the statistical transition map for the particular mobile wireless device as the particular mobile wireless device moves.

20. The non-transitory computer readable storage media of claim 16, and further comprising instructions that cause the processor to analyze the collected received signal strength and the location trace information against the statistical transition map generated to determine whether a mobility anomaly has occurred for the particular mobile wireless device.

* * * * *